April 12, 1932.   W. H. GRUENHAGEN   1,854,028

SPOON BAIT WITH OFFSET

Filed July 3, 1931

INVENTOR
WILLIAM H. GRUENHAGEN
BY
ATTORNEY

Patented Apr. 12, 1932

1,854,028

UNITED STATES PATENT OFFICE

WILLIAM H. GRUENHAGEN, OF ST. PAUL, MINNESOTA

SPOON BAIT WITH OFFSET

Application filed July 3, 1931. Serial No. 548,523.

This invention relates to an artificial fishbait. The invention particularly relates to a fishbait made of a metal plate, and being of novel form and configuration so that it will have a peculiar and very efficient action in the water.

The bait is of the type adapted to be drawn through the water either in casting or trolling and the bait will be appropriately colored to have a great attraction for the fish and to thus conform an efficient lure.

It is an object of this invention to provide a fishbait made from a metal plate of elongated form pressed into spoon shape, and having one end bent or turned helically for a part of the revolution, said plate having means for attaching a leader and a hook thereto.

It is a further object of the invention to provide an artificial bait made from a spoon shaped plate preferably of an elongated pear-shape which plate has its larger end offset from the remainder of the plate.

It is another object of the invention to provide a fishbait formed of a metal plate of elongated pear-shape, and made in the form of a spoon thus having convex and concave sides, said plate having a crescent-shape portion at its larger end offset bodily from its convex side towards its concave side, and a hook swivelly connected centrally to said offset portion.

It is still another object of the invention to provide such a bait as set forth in the preceding paragraph which plate is appropriately marked to form an attractive lure which has a leader attached thereto in a novel manner.

These and other objects and advantages of the invention will be fully set forth in the following description made in connection with the accompanying drawings, in which like reference characters refer to similar parts throughout the several views and in which.

Figure 1:
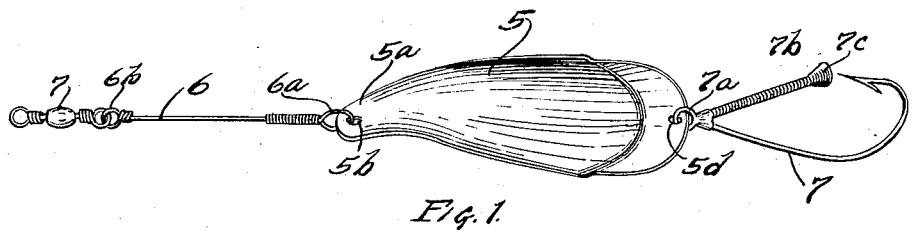
Fig. 1 is a bottom plan view of the bait.

Referring to the drawings, a bait is shown comprising a plate 5 preferably of metal, and while the shape of this plate can be varied in the embodiment of the invention illustrated, it is shown as of elongated pear-shape thus having rounded ends and sides which converge toward the smaller rounded end of the plate. The plate 5 is pressed into spoon-shape so as to have convex and concave sides and form a shallow bowl on the concave side. The smaller end portion $5a$ of plate 5 is turned or twisted for a portion of a revolution. While the amount of twist can be varied somewhat, it has been found in practice that a twist of slightly less than 180 degrees is preferable. If the twisting is made too great the bait does not have the desired action in the water. The plate is provided with a small hole $5b$ located centrally of its smaller end and adjacent the edge thereof for the attachment of a leader 6. Said leader 6 has one end extending through the hole $5b$ and as clearly shown in Figures 1 and 2 this loop is of oblong or substantially elliptical form. Leader 6 is provided at its other end with an eyelet $6b$ to which a swivel 7 of usual form is shown as attached. The plate 5 at its larger end has a portion $5c$ offset bodily from its convex side towards its concave side so as to be disposed in a different plane or curve from the adjacent portion. The portion $5c$ as clearly shown is crescent-shaped, and simulates the bill of an ordinary cap forming an article of clothing. It will be noted that the sides of the offset portion $5c$ converge into the sides of the adjacent portion of plate 5. Portion $5c$ is provided with a hole $5d$ and a hook 7 has an eyelet $7a$ extending through hole $5d$ so that said hook is swivelly connected to portion $5c$. While various forms of hooks may be used in the embodiment of the invention illustrated, the hooks 7 is shown as of weedless type and has a guard member $7b$ extending from the end of its shank and adjacent eyelet $7a$ to a point adjacent the point of the hook. Members $7b$ is shown as a coiled spring having a flaring conical portion $7c$.

Figure 2:
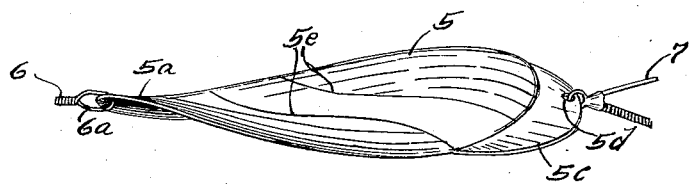
Fig. 2 is a perspective view of the portion of the bait as seen from the side thereof.
Figure 3:
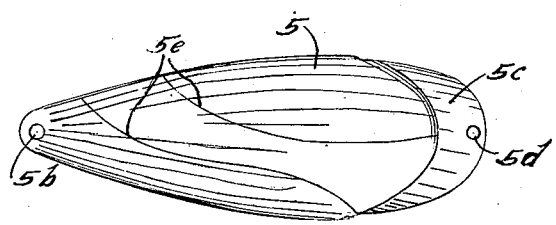
Fig. 3 is a top plan view of a part of the bait.
Figure 4:
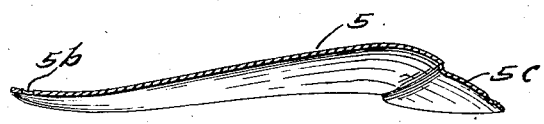
Fig. 4 is a vertical section taken on line 4—4 of Figure 3.

The portion of the plate 5 other than the offset portion 5c is preferably colored on its convex side, and in practice has been found very successful to have a zone within the lines 5e shown in Figs. 2 and 3 colored red or white while portions at the outer sides of these lines are colored or painted white or red respectively. The portion 5c is preferably nickelled and highly polished. The concave side of the bait can also be similarly colored or made of one red color or nickelplated.

In operation the bait is drawn through the water either after having been cast out or in a trolling operation. The plate 5 being of spoon shape has a wiggling action as it is drawn through the water and this, on account of the coloring and the high polish on portion 5c, causes flashes of color and brightness as the bait moves through the water, and a very efficient lure is thus formed. The helical portion 5a causes the bait to have a sinuous movement as it moves through the water. The combination of the helical portion, therefore, with the spoon shape gives a very desirable and effective motion to the bait. This is somewhat also affected by the offset portion 5c. The combination makes a very attractive efficient and improved bait. The bait has been amply demonstrated in actual practice and found to be very successful.

The bait is quite simple in construction, easily made, and can be marketed at a very reasonable price.

It will, of course, be understood that various changes may be made in the form, details, arrangement and proportions of the parts, without departing from the scope of applicant's invention, which generally stated, consists in a device capable of carrying out the objects above set forth in the parts and combinations of parts disclosed and defined in the appended claims.

What I claim is:

1. A fishbait comprising an elongated metal plate with rounded ends and sides converging from one end to the other, said piece being formed into spoon-shape with convex and concave sides and being turned helically for a small portion of a revolution at its smaller end, said plate having an opening at its smaller end for an attachment of its leader and having a hook swingably connected centrally to its larger end.

2. A fishbait comprising an elongated metal plate having a rounded rear end and a much smaller rounded front end with its sides converging from its larger to its smaller end, said piece being formed into spoon-shape with convex and concave sides, said plate having a portion at its larger end offset bodily from the adjacent portion, the surfaces of said offset portion being substantially parallel to the surfaces of said adjacent portion and a hook swingably connected at the end of said offset portion.

3. A fishbait comprising a metal plate of elongated shape, with rounded ends and tapering toward one end, said piece being formed into spoon-shape with convex and concave sides, said plate having an end portion of crescent-shape offset from the remainder of the plate and extending in the same general direction as the portion from which it is offset and a hook swingably connected to the central part of said offset portion.

4. A fishbait comprising a metal spoon of elongated shape having its ends formed substantially on the arcs of circles, one end being of much smaller radius and having its sides converging from its larger to its smaller end, said plate having a central opening at its smaller end, a leader attached to said end and having an oblong loop extending through said hole, and a hook swingably connected to the other end of said spoon.

5. A fishbait comprising a metal plate of elongated shape having rounded ends formed with radii of different lengths and its sides converging toward its smaller end, said plate being pressed into the form of a spoon having convex and concave sides, said plate having a crescent-shaped portion at its larger end offset bodily from its convex side towards its concave side, said portion being substantially parallel to the adjacent portion and a hook swingably connected to said offset portion.

6. A fish lure comprising an elongated metal plate having rounded ends, one end being formed on a much smaller radius than the other end and the sides of said plate converging towards said smaller end, said plate being formed into spoon shape and having a crescent shaped portion at its larger end offset bodily from the plane of the adjacent portion.

WILLIAM H. GRUENHAGEN.